(12) United States Patent
St-Jean et al.

(10) Patent No.: US 10,507,980 B1
(45) Date of Patent: Dec. 17, 2019

(54) GARMENT CONVEYOR TRANSPORT CLIP WITH SINGLE HANGER SELECTION

(71) Applicant: Planiform Conveyors Inc., Terrebonne (CA)

(72) Inventors: Gabriel St-Jean, Terrebonne (CA); Dominique Berthiaume, Mascouche (CA); Dominic Gosselin, Mascouche (CA); Sabrina Lagacé, St-Lin Laurentides (CA)

(*) Notice: Subject to any disclaimer, the term of this patent is extended or adjusted under 35 U.S.C. 154(b) by 0 days.

(21) Appl. No.: 16/282,823

(22) Filed: Feb. 22, 2019

(51) Int. Cl.
*B65G 19/02* (2006.01)
*B65G 47/61* (2006.01)

(52) U.S. Cl.
CPC ............ *B65G 19/025* (2013.01); *B65G 47/61* (2013.01); *B65G 2201/0229* (2013.01)

(58) Field of Classification Search
CPC ................. B65G 19/025; B65G 47/61; B65G 2201/0229
See application file for complete search history.

(56) References Cited

U.S. PATENT DOCUMENTS

| | | | |
|---|---|---|---|
| 3,799,395 A | 3/1974 | Vanderpool | |
| 5,806,657 A | 9/1998 | Enderlein et al. | |
| 6,609,608 B2 * | 8/2003 | Schneuing | B65G 19/265 104/172.1 |
| 6,960,761 B2 | 11/2005 | Clemmer | |
| 8,640,854 B2 | 2/2014 | Winkler | |
| 9,683,964 B2 | 6/2017 | Park et al. | |
| 9,891,194 B2 | 2/2018 | Mann et al. | |

FOREIGN PATENT DOCUMENTS

| | | | |
|---|---|---|---|
| DE | 9314235.8 U1 | 11/1993 | |
| DE | 19627449 C2 | 1/1998 | |
| DE | 29804038 U1 | 5/1998 | |
| DE | 102014105767 B4 * | 1/2018 | ........... B65G 19/025 |
| NL | 1006376 C1 | 12/1998 | |

OTHER PUBLICATIONS

Meier, F., et al. "Parallel Accumulation-Serial Fragmentation (PASEF): Multiplying Sequencing Speed and Sensitivity by Synchronized Scans in a Trapped Ion Mobility Device" Journal of Proteome Research, 2015, vol. 14 (12), pp. 5378-5387.

* cited by examiner

*Primary Examiner* — Gene O Crawford
*Assistant Examiner* — Keith R Campbell
(74) *Attorney, Agent, or Firm* — Benoit & Côté Inc.

(57) ABSTRACT

A sorting clip for a garment conveyor attaches to a drive chain below which is a hanger support on which a group of garment hangers is suspended from a frontmost to a rearmost hanger. The clip has an upper portion fixed to the drive chain and a lower portion attached to the upper portion by a pivotable connected biased in a first direction of increasing angular separation between the two portions. An underside of the lower portion has disassociation teeth and a capture hook that contact the frontmost hanger to successively engage and separate the frontmost hanger from the other hangers, after which disengagement of the teeth from the frontmost hanger allows for sufficient pivoting of the lower portion in said first direction that the hook engages and captures the frontmost hanger.

18 Claims, 6 Drawing Sheets

GARMENT CONVEYOR TRANSPORT CLIP WITH SINGLE HANGER SELECTION

BACKGROUND OF THE INVENTION

Field of the Invention

This invention relates generally to the field of overhead conveyor systems and, more particularly, to carrying clips for transporting garments on hangers in such a system.

Description of the Related Art

Garment conveyors are commonly used in business locales for which the storage and retrieval of a large number of garments is necessary. Many systems use hangers on which to store the garments, such as shirts, jackets or pants. To efficiently transport the garments to and from various storage locations, a conveyor system may be used. Typical overhead conveyors rely on an elevated track to which movable transport components are attached. A chain or cable that is secured to the track makes a closed loop and follows the track in one or two directions, driven by a motor. Transport components that are connected to the chain will be thereby guided along the track. By attaching a hanger carrying a garment to such a component, it may be used to guide the garment to a designated location by moving the transport component along the track.

In modern garment conveyors, supporting transport components are often referred to as "clips," and typically have a hook that accommodates the upper, curved portion of a hanger. As the clip is moved along the track from one location to another, the hanger, and attached garment, moves along with it. In automated systems, different mechanisms have been used to allow for a hanger to be selectively attached and detached to a clip. In addition to the problem of reliably capturing a hanger of interest, it is often difficult as well to capture just one hanger at a time, as the hangers tend to hang adjacent to one another.

SUMMARY OF THE INVENTION

In accordance with the present invention, a sorting clip for a garment conveyor is provided that attaches to a drive chain that is positioned above a hanger support on which multiple garment hangers are suspended. The garment hangers are typically grouped together in various storage locations, from a frontmost to a rearmost hanger relative to a transportation direction in which the clip travels. As the clip passes the group of hangers, it captures the frontmost hanger and transports it to another location along the path of the conveyor.

In an exemplary embodiment, the clip includes an upper portion that is fixed to the drive chain, and that is pivotably connected to a lower portion. The pivotable connection is biased in a first direction of increasing angular separation between the upper and lower portions, such as by a compression spring between the two portions. An underside of the lower portion includes a ridge that makes contact with the garment hangers as the clip is transported by the drive chain.

The ridge of the lower portion has a front section and a rear section that each have a different angular orientation relative to each other. In particular, the relative angular orientation is such that, if the front section is parallel to a top surface of the hanger support, the rear section is pivoted in an upward direction away from that top surface. Thus, when the front section is in contact with the hangers, contact between the rear section and the hangers is prevented. In this embodiment, the front section has a substantially smooth surface facing the hangers, while the rear section has a series of dissociation teeth and a capture hook.

As the clip advances towards a group of hangers with movement of the drive chain, the front section of the ridge contacts the rearmost hanger, which provides a force against the bias of the clip so as to reduce the angular separation between the upper portion and the lower portion. The relatively smooth surface of the front section continues across the top, curved portions of the hangers, while the position of the rear section is angled upward to prevent contact between the capture hook and the hangers. Advancement of the front section past the frontmost hanger thereafter results in progressive contact between the frontmost hanger and the dissociation teeth, as the lower section pivots in the first direction. The dissociation teeth have shallow indentations that successively engage the frontmost hanger and separate it from the other hangers, after which disengagement of the teeth from the frontmost hanger allows for sufficient pivoting of the lower portion in the first direction that the capture hook engages and captures the frontmost hanger.

In the present embodiment, the angular separation of the upper and lower portions of the clip in the first direction is limited by contact between respective interior surfaces of the upper and lower portions, so as to maintain the angular separation at a neutral position in the absence of external forces. At this separation, prior to contact between the front section of the ridge of the lower portion and the hangers, a relative separation between the ridge front section and a top surface of the hanger support is between 10° and 20°. When the front section is in contact with the hangers, the lower portion of the clip is pivoted in a direction opposite the first direction so that the front surface is roughly parallel with the top surface of the hanger support. In this position, the rear section of the ridge is angled upward, and has an angle relative to the top surface of the hanger support of between 5° and 15°. In the exemplary embodiment, the hook is a slot in the ridge structure, and when the lower section pivots back down to the point at which the hook captures the frontmost hanger, the slot has an opening at a contact surface of the ridge that is closer to a front of the clip than an interior portion of the slot. Due to the force on the hanger provided by the motion of the clip, the hanger is retained adjacent to the interior portion of the slot while being transported.

DETAILED DESCRIPTION

Figure 1:
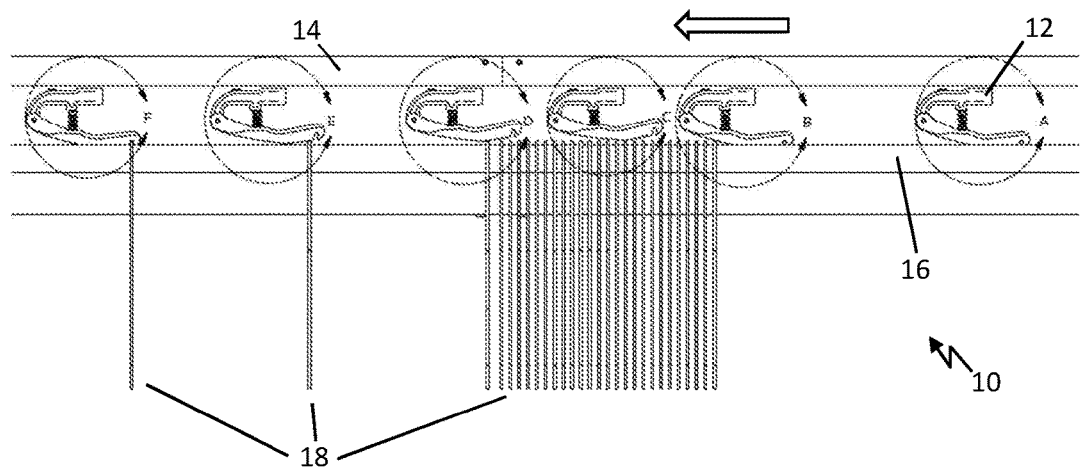
FIG. 1 is a schematic view of a portion of a conveyor system according to the invention showing a sorting clip at different positions relative to a group of garment hangers.

Depicted in FIG. 1 is a section of a garment conveyor system 10 showing a sorting clip 12 at different positions along a transportation path of the system. The clip 12 is located between an upper chain strip 14 that houses a drive chain and a lower clip strip 16 on which garment hangers 18 may be hung. A closed loop chain resides in the chain strip 14 and is driven by a motor at a desired operating speed, such that the chain moves continuously through the chain strip. A top portion of the clip 12 is fixed to the chain, and thereby travels with it as it moves. A lower portion of the clip is adjacent to the clip strip 16, and engages with hangers 18 on the clip strip as it moves past, as described in more detail below. The arrow shown in the figure indicates the direction of travel of the clip as it moves along the transportation path.

Figure 2A:
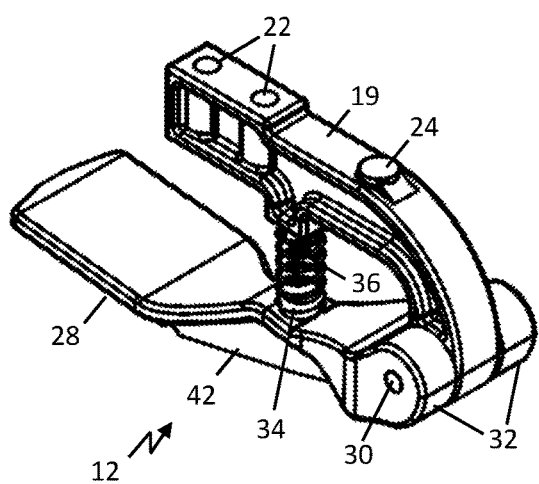
FIG. 2A is a first perspective view of a sorting clip according to the invention.
Figure 2B:
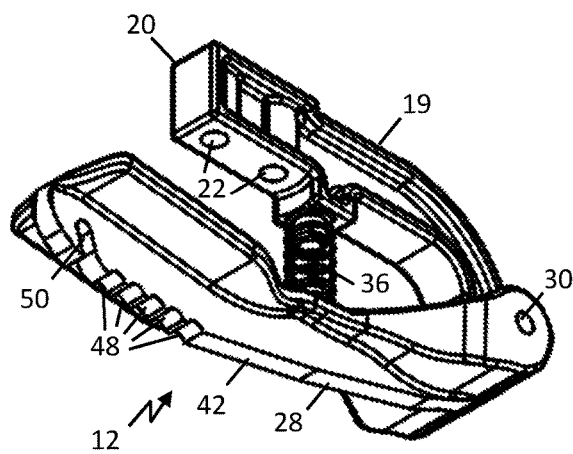
FIG. 2B is a second perspective view of the sorting clip.

Clip 12 is shown in more detail in FIGS. 2A and 2B, which are different perspective views of the clip. An upper portion 19 of the clip includes a chain attachment section 20 that connects to the chain in a manner that prevents rotation, such that the clip maintains its orientation relative to the chain strip and clip strip. In the present embodiment, there are two connection holes 22 that pass through the attachment section 20, and through which pins pass and connect to one of the links of the drive chain. By connecting at two points, rotation of the clip is prevented. Closer to the front of the clip is projection 24, which is an integral part of the clip body, and which makes contact with a different link of the drive chain. This projection is sized so that, when it is in contact with the chain and the upper portion 19 is secured to the chain, the clip is in the proper orientation for operation. Contact between the projection 24 and the chain also prevents any errant hanger from accidentally advancing too far along a top surface of the upper portion 19 where it might interfere with the chain operation. On the underside of the upper portion 19 is a spring alignment post 26 (as shown more clearly in FIGS. 6A and 6B), which serves to maintain the position of a compression spring 36 of the clip 12, as is discussed in more detail below.

A lower portion 28 of the clip 12 is connected to the upper portion 19 via a pivoting connection enabled by pivot pin 30, which passes through holes in overlapping parts of the upper and lower portions 19, 28. As clearly shown in FIG. 2A, a front end of upper portion 19 fits in a front end of lower portion 28, which has two parallel extensions 32 that receive the front end of the upper portion between them, and that each have a receiving hole for pivot pin 30, which also passes through a receiving hole in the upper portion 19. The front end of the upper portion 19 and the parallel extensions 32 of the lower portion 28 are sized so that the surfaces thereof are in close proximity, but have little, if any, friction between them. The pivot pin 30 secures the two portions 19, 28 together, but allows a relative angular motion between them about the pivot pin axis.

An upper surface of the lower portion 28 has a spring retention post 34 that, when the upper and lower portions are assembled together, resides opposite the spring alignment post of the upper portion 19. A compression spring 36 resides between the upper and lower portions, with an interior channel of the spring surrounding the spring retention post 34 on one side and the spring alignment post 26 of the upper portion on the other side. The spring retention post 34 also has lip at the end closest to upper portion 19 with a larger diameter than the rest of the post, and a larger diameter than an inner diameter of the interior channel of the spring 36. During assembly, the spring may be stretched, or threaded, around the lip and onto the post 34. The lip thereby secures the spring 36 to the post and inhibits its detachment therefrom.

The compression spring 36 rests between the upper portion 19 and the lower portion 28 in a compressed state, thereby forcing the two portions of the clip apart such that the pivoting connection is biased in a direction of increasing angular separation between the upper portion 19 and the lower portion 28. As depicted in the side view of FIG. 2C, which shows hidden interior surfaces of the clip in broken lines, the pivoting of the two clip portions in this direction is limited by contact between surfaces of the upper portion 19 and the lower portion 28. In particular, a surface 25 of the upper portion 19 includes a lip 29 that makes contact with a surface 27 of the lower portion 28 when the two portions are forced apart by the spring 36 in a direction of increasing angular separation between them. Thus, in the absence of any outside force, the clip 12 is biased with the upper and lower portions in the relative orientation shown in FIGS. 2A-2C.

As shown in FIG. 1, in operation the clip 12 is position between chain strip 14 and clip strip 16, which have a constant relative separation along the length of the transportation path. As the upper portion 19 of the clip 12 is advanced by the chain to which it is connected, the lower portion 28 travels adjacent to the clip strip 16 and, consequently, makes contact with any hangers 18 that are suspended on it. On the underside of the lower portion 28 are certain features that define how the clip interacts with the clip strip and the hangers.

Figure 3:
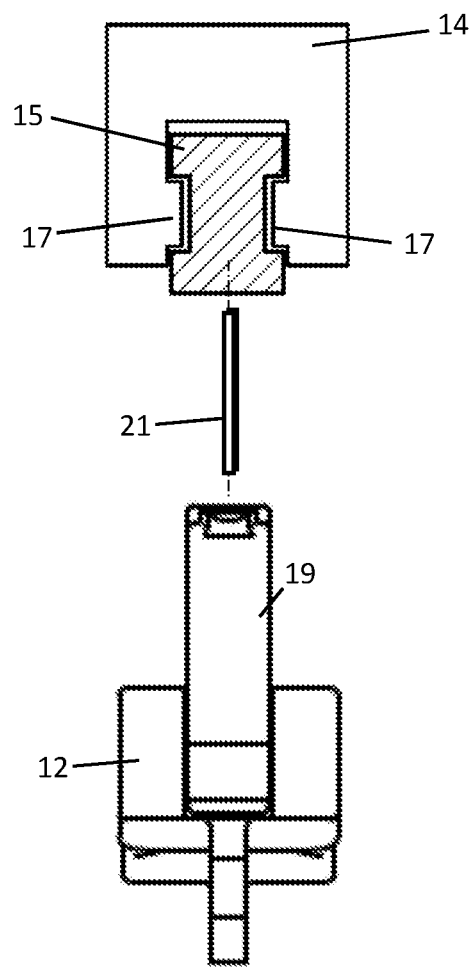
FIG. 3 is a front view of the sorting clip and a cross-sectional view of a drive chain and chain strip in which the chain resides.

FIG. 3 is a cross-sectional schematic view of the chain strip 14 and chain 15, and a rear view of the clip 12. The chain strip 14 has indentations 17 that retain the chain, while allowing it to travel longitudinally through the chain strip 14. In this view, the clip 12 is shown from the front, with an indication of how the upper portion 19 connects to chain 15 via pins 21 that pass through the upper portion 19 and fasten to the chain. In the present embodiment, pins in one link of the drive chain 15 are removed and replaced with the longer pins 21 of the invention, which extend into the connection holes 22 of upper portion (best shown in FIG. 2A), and are retained therein by raised surface features of the pins that provide a secure pressure fit within the holes 22. However, those skilled in the art will recognize that other means of fastening the clip to the chain may be used without departing from the principles of the invention. When connected to the chain 15 in this way, the clip 12 follows the chain as it travels through the chain strip.

Figure 4:
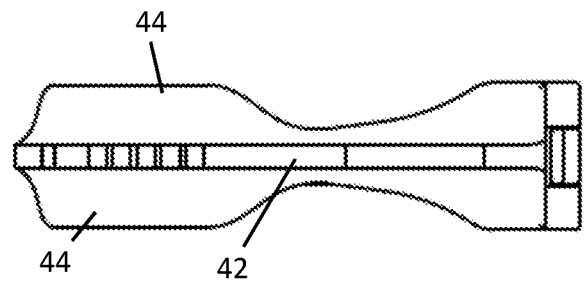
FIG. 4 is a bottom view of the sorting clip.

FIG. 4 is a bottom view of the clip 12, showing that the lower portion has a central ridge 42 and, to each side of it, wing regions 44 with a flat, wide profile. As discussed further below, the ridge 42 controls the interaction of the clip with hangers 18, while the wing regions 44 provide surfaces that may be used for presenting information, such as a bar code label, for a particular conveyor application, such as sorting or otherwise uniquely identifying garments being transported.

Figure 5:
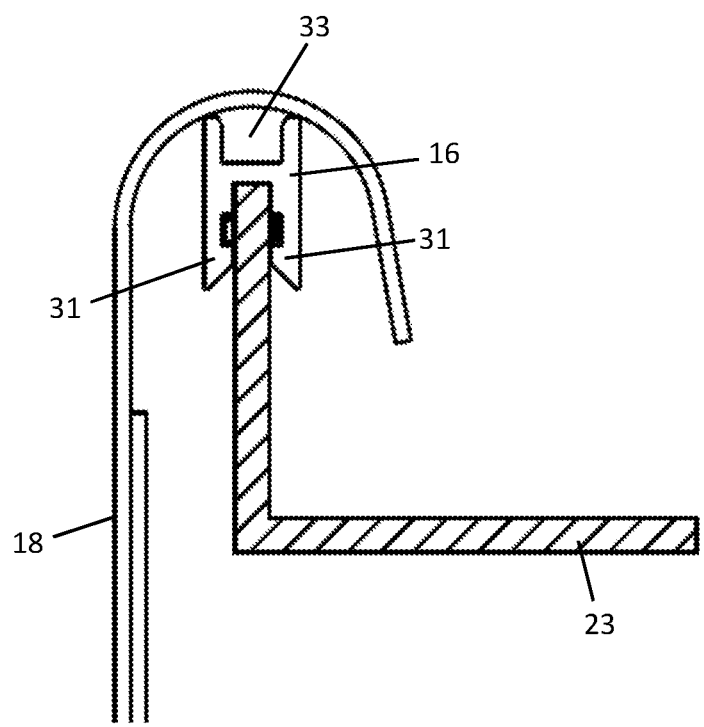
FIG. 5 is a cross-sectional schematic view of a clip strip and clip strip support, along with a hanger suspended from the clip strip.

Shown in FIG. 5 is a schematic, cross-sectional view of clip strip 16 mounted on support frame 23 of the conveyor system which is, in this instance, L-shaped, although those skilled in the art will recognize that other support structures might be used as well. The clip strip 16 may be of different materials although, in the present embodiment, it is a low-friction, extruded plastic material having extending portions 31 that grip the support frame 23 that is received therebetween. A slot 33 of the clip strip opens upward, facing the chain strip, and is sized and positioned to receive the ridge 42 of the clip 12. Also shown in the figure is hanger 18, which is shown in its typical position suspended from the clip strip. The opening of the slot 33 below the curved portion of the hanger provides a space for the capture hook 50 to capture the hanger, as discussed in more detail below.

Hanger 18 will typically be one of many that are suspended from the clip strip, and that tend to bunch together, making the capture of individual hangers more challenging. The clip strip 16 is directly below the chain strip 14, and is separated therefrom by a distance that results in the ridge of a clip 12 attached to the chain 15 remaining partially within the slot 33 of the clip strip 16 as it travels along the transportation path in a neutral position, that is, when no hangers 18 are being contacted. When the clip 12 arrives at the location of a hanger 18 or, more typically, a group of hangers, interaction between the clip 12 and the hangers 18 results in the separation and capture of a frontmost hanger, as discussed in more detail below.

Figure 6A:
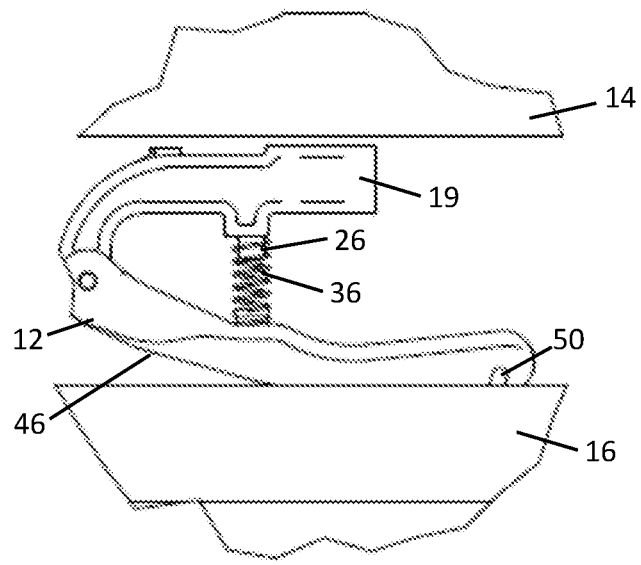
FIG. 6A is a schematic side view of the sorting clip in a neutral state between the chain strip and the clip strip.

Operation of the system will be better understood in conjunction with FIGS. 6A-6F. FIG. 6A shows the clip 12 in a neutral position as it travels along the transportation path between the chain strip 14 and the clip strip 16. In this position, the upper portion 19 and the lower portion 28 of the clip 12 are at a maximum relative separation (i.e., the "neutral" state), being forced apart by the compression spring 36 to the limit of the pivotable range. As shown, in this position, the ridge 42 of the clip 12 resides partially in the slot 33 of the clip strip 16.

Figure 6B:
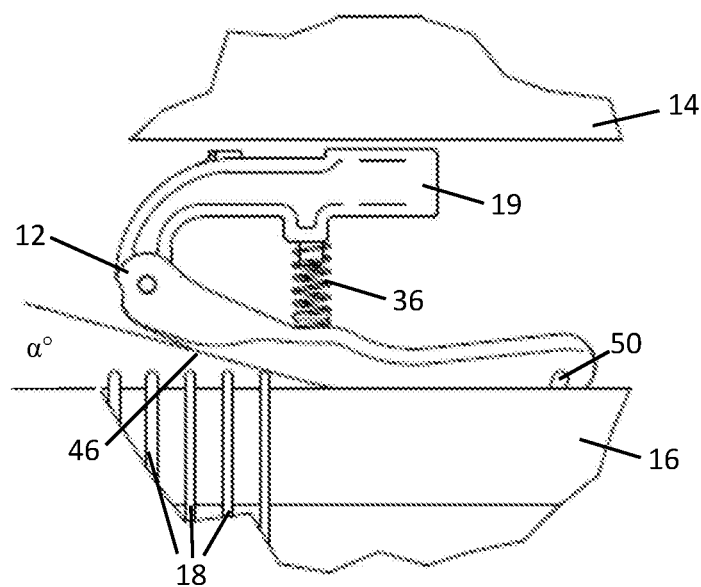
FIG. 6B is a schematic side view of the sorting clip as the lifting section of the lower portion makes contact with a rearmost hanger of a group of hangers.

As the clip 12, still in the neutral state, makes contact with a first hanger suspended from the clip strip 16, as shown in FIG. 6B, the lifting section 46 of ridge 44 has an "attack angle" of $\alpha°$ relative the apex of the clip strip 16. This angle provides the necessary mechanical advantage to force the lower portion 28 of the clip 12 to pivot upward against the force of the spring 36, and is selected based on several factors, including the size of the clip and the compression force of spring 36. The specific angle $\alpha$ may be easily determined by one skilled in the art, generally falling in the range of 10° to 20°, and in the present embodiment is approximately 16°. As the clip 12 advances, the lower portion 28 continues to pivot until, as shown in FIG. 6C, the minimum separation between the upper and lower portions is achieved.

Figure 6C:
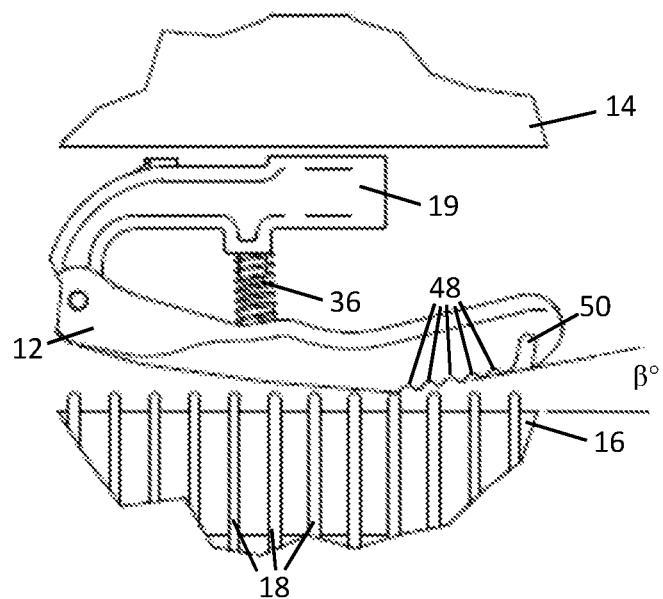
FIG. 6C is a schematic side view of the sorting clip as the lifting section of the lower portion is riding atop the group of hangers.

In the position of FIG. 6C, the ridge is completely outside of the slot 33 of the clip strip 16, and a rear portion of ridge 44 is rotated upward away from the clip strip 16 and hangers 18. Located along this rear portion is a series of dissociation teeth 48 and a hook 50. For a series of adjacent hangers 18 encountered by the clip 12, as typically occurs, the ridge 44 of the lower portion 28 continues to ride along the top surfaces of the hangers 18, deviating only slightly from the position of maximum pivot as the force on the ridge continues to be provided by successive hangers 18. As shown in FIG. 6C, until the frontmost hanger is reached, this maintains the rear portion of the ridge 44 at an angle $\beta$ that prevents interaction between the hangers 18 and most of the dissociation teeth 48 and the hook 50. This angle may be determined based on the dimensions of the clip 12, the teeth 48 and the hangers 18, and in the present embodiment is approximately 10°. In particular, the angle is chosen to prevent interaction between the hangers and the majority of the teeth 48 and the hook 50 until the frontmost hanger is reached.

Figure 6D:
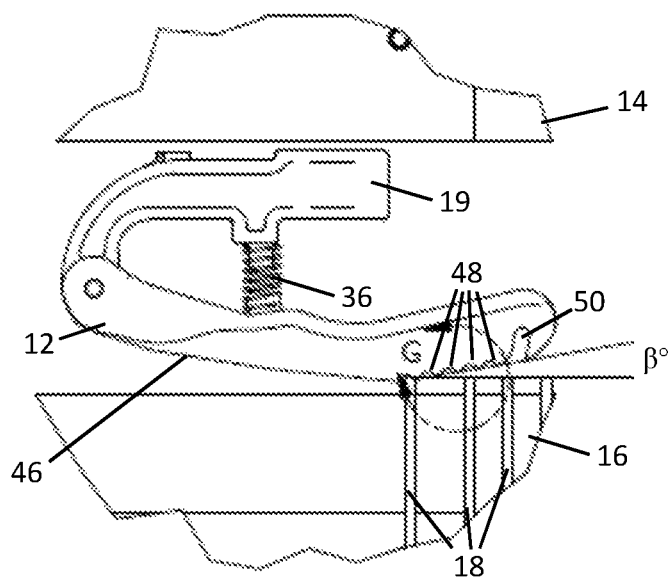
FIG. 6D is a schematic side view of the sorting clip as the lifting section passes the frontmost hanger of the group of hangers.

When the clip 12 reaches the frontmost hanger 18 in a grouping, as shown in FIG. 6D, the spring 36 forces the lower portion 28 to pivot further away from the upper portion 19, since there are no more hangers in contact with the lifting section 46 of the ridge 44. The corresponding reduction of the angle $\beta$ allows the dissociation teeth 48 to begin to engage the frontmost hanger, and as the first tooth advances past the frontmost hanger, the lower portion continues to pivot downward, allowing the other teeth 48 to successively make contact with the frontmost hanger. As shown in the figure, the teeth 48 are roughly hemispherical in shape, and each is sized to fit with the top of a hanger, while being too shallow to capture it completely. With the pressure applied by the compression spring 36, each tooth that engages a hanger 18 provides a radial force that is translated by the shape and coefficient of friction of the tooth to a lateral force that drags the hanger 18 slightly forward on the clip strip 16 before the tooth slides past and disengages from that hanger. This is repeated with the subsequent teeth, and the collective effect is to thereby provide a significant separation of the frontmost hanger from the other hangers of the group, making it easier to subsequently capture, as is discussed further below.

Figure 2C:
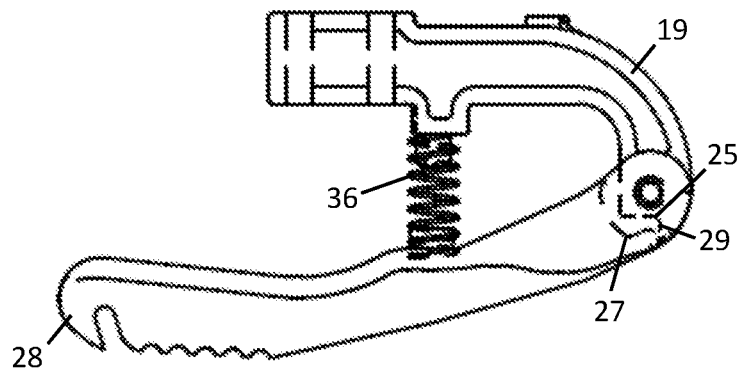
FIG. 2C is a side view of the sorting clip showing hidden surfaces in broken lines.
Figure 6E:
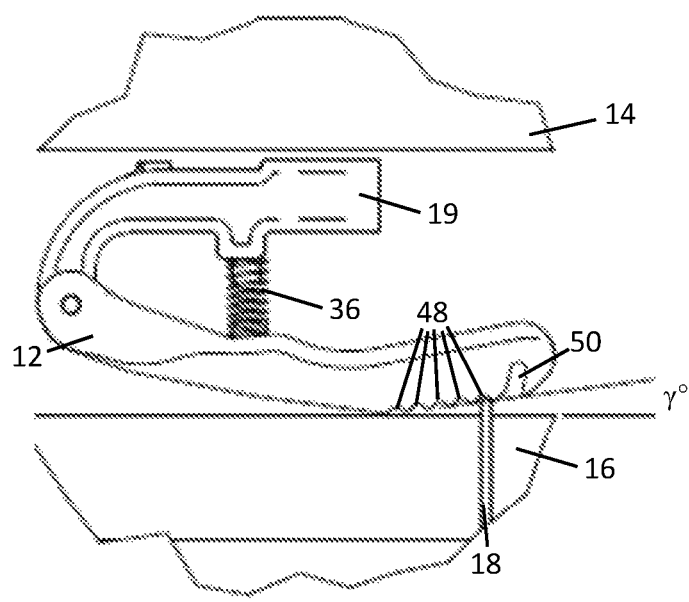
FIG. 6E is a schematic side view of the sorting clip as the dissociation teeth move past the frontmost hanger of the group of hangers.
Figure 6F:
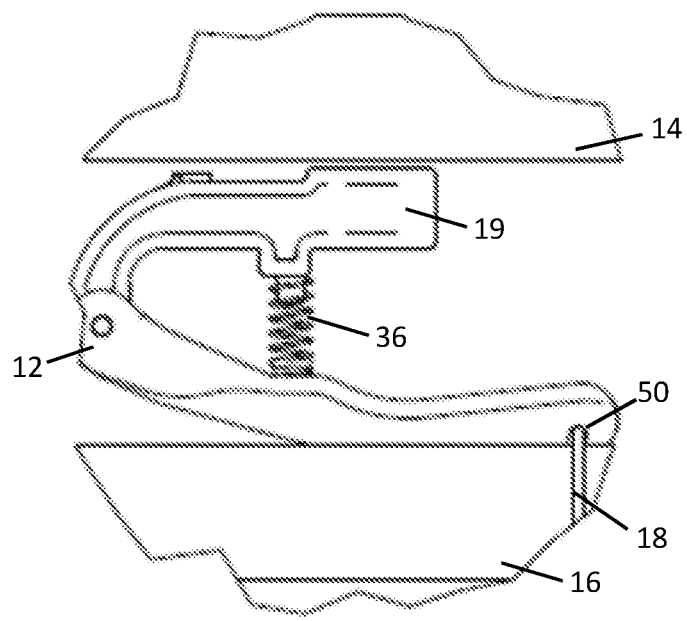
FIG. 6F is a schematic side view of the sorting clip as the capture hook captures the frontmost hanger of a group of hangers.

By the time the last dissociation tooth 48 has reached the frontmost hanger 18 of a grouping, that hanger has been well separated from those behind it, and the angle $\beta$ has been further reduced. This is depicted in FIG. 6E, and subsequent advancement of the clip 12 results in the further pivoting away of the lower portion 28 from the upper portion 19 as the force of spring 36 causes the hook 50 to engage the top portion of the hanger, as shown in FIG. 6F. The profile of the hook 50, which is best shown in FIG. 2C, has a depth that is several times the diameter of the hanger material. It is wide enough to receive the diameter of the hanger, and has a longitudinal shape that, with the lower portion 28 fully descended, as shown in FIG. 2C, is pitched with the upper part of the hook 50 further to the rear of the clip 12 than the lower part. With the continuous movement of the clip 12 along the transportation path this, in turn, tends to force the hanger into the upper portion of the hook 50, regardless of whether the hanger is still in contact with the clip strip 16.

With an individual garment hanger 18 successfully captured, it is then transported by the conveyor to a desired destination, as shown in FIG. 1. Release of the garment hanger may be accomplished by engagement of the clip with a stop mechanism that makes contact with the lifting section 46 of the ridge 44, pivoting the lower section 28 of the clip 12 upward. This moves the hook 50 away from the clip strip 16 while simultaneously changing the relative longitudinal orientation of the hook 50 so that is no longer biased with the upper part of the hook 50 further to the rear of the clip than the lower part. This reduces the tendency of the hanger 18 to remain in the upper part of the hook 50, and it slides off onto the clip strip front of the stop mechanism. As additional hangers 18 are deposited in this location, those hangers 18 will likewise engage the lifting section 46 of subsequent clips, forcing a similar release of the hangers they are transporting. Since a clip will remain in this compressed position until after it passes the stop mechanism, no other hangers will be captured in this region, and the arriving hangers will be progressively deposited at positions further and further from the stop mechanism.

Those skilled in the art will understand that the conveyor system will operate at a relatively high rate of speed with numerous clips at different positions along the chain individually capturing individual hangers for transportation along the transportation path. The clip of the present invention permits not only effective capturing of the hangers, but avoids the inadvertent capture of multiple hangers by a single clip, which might prevent proper routing of the garments by the conveyor system. In particular, the dissociation teeth help to separate the frontmost hanger from the other hangers prior to the engagement of the hook with the frontmost hanger.

The invention claimed is:

1. A sorting clip for a garment conveyor having a drive chain to which the clip is attached and a hanger support positioned beneath the drive chain on which each of a plurality of garment hangers is suspended from a frontmost to a rearmost hanger relative to a transportation direction in which the clip travels, the sorting clip comprising:
   an upper portion that is fixed to the drive chain; and
   a lower portion that is attached to the upper portion by a pivotable connection biased in a first direction of increasing angular separation between the upper and lower portions, an underside of the lower portion comprising a ridge that makes contact with the garment hangers as the clip is transported by the drive chain, the ridge including a front section and a rear section that has a series of disassociation teeth and a capture hook, the front and rear sections having a relative angular orientation that maintains the hook at a position that prevents contact between the hook and the hangers while the front section is in contact with the hangers, advancement of the front section past the frontmost hanger resulting in contact between the frontmost hanger and the dissociation teeth as the lower section pivots in said first direction, the dissociation teeth having shallow indentations that successively engage and separate the frontmost hanger from the other hangers, after which disengagement of the dissociation teeth from the frontmost hanger allows for sufficient pivoting of the lower portion in said first direction that the hook engages and captures the frontmost hanger.

2. A sorting clip according to claim 1 further comprising a compression spring between the upper and lower portions that provides said bias of the pivoting connection therebetween.

3. A sorting clip according to claim 1 wherein, prior to contact between the front section of the ridge and the hangers, a relative angle $\alpha$ between the front section and a top surface of the hanger support is between 10° and 20°.

4. A sorting clip according to claim 1 wherein, when the front section of the ridge is in contact with the hangers, a relative angle $\beta$ between the rear section of the ridge and a top surface of the hanger support is between 5° and 15°.

5. A sorting clip according to claim 1 wherein the capture hook comprises a slot in the ridge that, when positioned to capture the frontmost hanger, has an opening at a contact surface of the ridge that is closer to a front of the clip than an interior portion of the slot, such that a captured hanger is retained adjacent to said interior portion of the slot by motion of the clip.

6. A sorting clip according to claim 1 wherein said angular separation of the upper and lower portions of the clip in the first direction is limited by contact between respective interior surfaces of the upper and lower portions so as to maintain said angular separation at a neutral position in the absence of external forces.

7. A garment conveyor system comprising:
   a drive chain;
   a hanger support positioned beneath the drive chain on which each of a plurality of garment hangers is suspended from a frontmost to a rearmost hanger relative to a transportation direction of the conveyor system; and
   a sorting clip having an upper portion that is fixed to the drive chain and a lower portion that is attached to the upper portion by a pivotable connection biased in a first direction of increasing angular separation between the upper and lower portions, an underside of the lower portion comprising a ridge that makes contact with the garment hangers as the clip is transported by the drive chain, the ridge including a front section and a rear section that has a series of disassociation teeth and a capture hook, the front and rear sections having a relative angular orientation that maintains the hook at a position that prevents contact between the hook and the hangers while the front section is in contact with the hangers, advancement of the front section past the frontmost hanger resulting in contact between the frontmost hanger and the dissociation teeth as the lower section pivots in said first direction, the dissociation teeth having shallow indentations that successively engage and separate the frontmost hanger from the other hangers, after which disengagement of the dissociation teeth from the frontmost hanger allows for sufficient pivoting of the lower portion in said first direction that the hook engages and captures the frontmost hanger.

8. A garment conveyor system according to claim 7 wherein the clip further comprises a compression spring between the upper and lower portions that provides said bias of the pivoting connection therebetween.

9. A garment conveyor system according to claim 7 wherein the clip is oriented such that, prior to contact between the front section of the ridge and the hangers, a relative angle $\alpha$ between the front section and a top surface of the hanger support is between 10° and 20°.

10. A garment conveyor system according to claim 7 wherein the clip is oriented such that, when the front section of the ridge is in contact with the hangers, a relative angle $\beta$ between the rear section of the ridge and a top surface of the hanger support is between 5° and 15°.

11. A garment conveyor system according to claim 7 wherein the capture hook of the clip comprises a slot in the ridge that, when positioned to capture the frontmost hanger, has an opening at a contact surface of the ridge that is closer to a front of the clip than an interior portion of the slot, such that a captured hanger is retained adjacent to said interior portion of the slot by motion of the clip.

12. A garment conveyor system according to claim 7 wherein said angular separation of the upper and lower portions of the clip in the first direction is limited by contact between respective interior surfaces of the upper and lower portions so as to maintain said angular separation at a neutral position in the absence of external forces.

13. A method of individually transporting each of a plurality of garment hangers with a garment conveyor system, the garment hangers being suspended from a hanger support from a frontmost to a rearmost hanger relative to a transportation direction of the conveyor system, the method comprising:

provessing a drive chain positioned above the hanger support that moves along the transportation direction;

fixing a sorting clip to the drive chain, the clip having an upper portion that attaches the clip to the drive chain and a lower portion that is attached to the upper portion by a pivotable connection biased in a first direction of increasing angular separation between the upper and lower portions, an underside of the lower portion comprising a ridge that makes contact with the garment hangers as the clip is transported by the drive chain, the ridge including a front section and a rear section that has a series of disassociation teeth and a capture hook, the front and rear sections having a relative angular orientation that maintains the hook at a position that prevents contact between the hook and the hangers while the front section is in contact with the hangers; and moving the drive chain to advance the clip such that the front section of said ridge contacts the hangers, rotating the lower portion of the clip in a direction opposite the first direction, and subsequently moves past the frontmost hanger to allow contact between the frontmost hanger and the dissociation teeth as the lower section pivots in said first direction, the dissociation teeth having shallow indentations that successively engage and separate the frontmost hanger from the other hangers, after which disengagement of the dissociation teeth from the frontmost hanger allows for sufficient pivoting of the lower portion in said first direction that the hook engages and captures the frontmost hanger.

14. A method according to claim 13 wherein the pivotable connection of the clip is biased by a compression spring between the upper and lower portions.

15. A method according to claim 13 wherein, prior to contact between the front section of the ridge and the hangers, a relative angle $\alpha$ between the front section and a top surface of the hanger support is between 10° and 20°.

16. A method according to claim 13 wherein, when the front section of the ridge is in contact with the hangers, a relative angle $\beta$ between the rear section of the ridge and a top surface of the hanger support is between 5° and 15°.

17. A method according to claim 13 wherein the capture hook comprises a slot in the ridge that, when positioned to capture the frontmost hanger, has an opening at a contact surface of the ridge that is closer to a front of the clip than an interior portion of the slot, such that a captured hanger is retained adjacent to said interior portion of the slot by motion of the clip.

18. A method according to claim 13 wherein said angular separation of the upper and lower portions of the clip in the first direction is limited by contact between respective interior surfaces of the upper and lower portions so as to maintain said angular separation at a neutral position in the absence of external forces.

* * * * *